(12) United States Patent
Ohira et al.

(10) Patent No.: US 10,682,959 B2
(45) Date of Patent: Jun. 16, 2020

(54) DISPLAY DEVICE AND VEHICLE REARVIEW MIRROR

(71) Applicant: Japan Display Inc., Tokyo (JP)

(72) Inventors: Hirofumi Ohira, Tokyo (JP); Koji Yoshida, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/052,771

(22) Filed: Aug. 2, 2018

(65) Prior Publication Data

US 2019/0047476 A1 Feb. 14, 2019

(30) Foreign Application Priority Data

Aug. 9, 2017 (JP) .................................. 2017-154785

(51) Int. Cl.
| | |
|---|---|
| *B60R 1/12* | (2006.01) |
| *G02F 1/1335* | (2006.01) |
| *G02F 1/1343* | (2006.01) |
| *B60R 1/04* | (2006.01) |
| *B60R 11/04* | (2006.01) |
| *G02F 1/1347* | (2006.01) |

(52) U.S. Cl.
CPC ................... *B60R 1/12* (2013.01); *B60R 1/04* (2013.01); *B60R 11/04* (2013.01); *G02F 1/13439* (2013.01); *G02F 1/13471* (2013.01); *G02F 1/133528* (2013.01); *B60R 2001/1253* (2013.01)

(58) Field of Classification Search
CPC .. B60R 1/12; B60R 11/04; B60R 1/04; B60R 2001/125; G02F 1/13471; G02F 1/13439; G02F 1/133528
See application file for complete search history.

(56) References Cited

U.S. PATENT DOCUMENTS

| | | | |
|---|---|---|---|
| 2004/0100598 A1 | 5/2004 | Adachi et al. | |
| 2009/0015736 A1* | 1/2009 | Weller | B60R 1/12 349/11 |

FOREIGN PATENT DOCUMENTS

JP 2001-318374 A 11/2001

* cited by examiner

*Primary Examiner* — Phu Vu
(74) *Attorney, Agent, or Firm* — K&L Gates LLP

(57) ABSTRACT

According to an aspect, a display device includes: a first polarization member configured to absorb light linearly polarized in a second polarization direction orthogonal to a first polarization direction; an optical sheet configured to reflect light linearly polarized in the second polarization direction and transmit light linearly polarized in the first polarization direction; a front panel disposed between the first polarization member and the optical sheet and capable of changing a polarization direction of incident light into another polarization direction in accordance with a voltage applied to the front panel; and a display panel overlapping with the front panel with a second polarization member interposed therebetween, the second polarization member configured to transmit light linearly polarized in the second polarization direction to the optical sheet.

6 Claims, 6 Drawing Sheets

US 10,682,959 B2

DISPLAY DEVICE AND VEHICLE REARVIEW MIRROR

CROSS-REFERENCE TO RELATED APPLICATIONS

This application claims priority from Japanese Application No. 2017-154785, filed on Aug. 9, 2017, the contents of which are incorporated by reference herein in its entirety.

BACKGROUND

1. Technical Field

The present disclosure relates to a display device and a vehicle rearview mirror that are capable of displaying an image both in a reflective state in which incident light is reflected and in a transmissive state in which incident light is transmitted.

2. Description of the Related Art

Japanese Patent Application Laid-open Publication No. 2001-318374 (JP-A-2001-318374) discloses a device that can switch between a display state in which an image is displayed and a mirror state (reflective state) in which a reflected image is obtained.

A display device described in JP-A-2001-318374 enters the reflective state when a voltage applied thereto is higher than or equal to a threshold. Consequently, the display device consumes power in the reflective state.

The present disclosure is directed to providing a display device and a vehicle rearview mirror that can reduce power consumption in the reflective state.

SUMMARY

According to an aspect, a display device includes: a first polarization member configured to absorb light linearly polarized in a second polarization direction orthogonal to a first polarization direction; an optical sheet configured to reflect light linearly polarized in the second polarization direction and transmit light linearly polarized in the first polarization direction; a front panel disposed between the first polarization member and the optical sheet and capable of changing a polarization direction of incident light into another polarization direction in accordance with a voltage applied to the front panel; and a display panel overlapping with the front panel with a second polarization member interposed therebetween, the second polarization member configured to transmit light linearly polarized in the second polarization direction to the optical sheet.

According to another aspect, a vehicle rearview mirror capable of displaying an image both in a reflective state in which incident light is reflected and in a transmissive state in which incident light is transmitted, the vehicle rearview mirror includes: the display device described above; and an image capturing device configured to capture an image of a region behind a vehicle. The display panel displays an image in the transmissive state, and the display panel displays no image in the reflective state.

DETAILED DESCRIPTION

Figure 1:
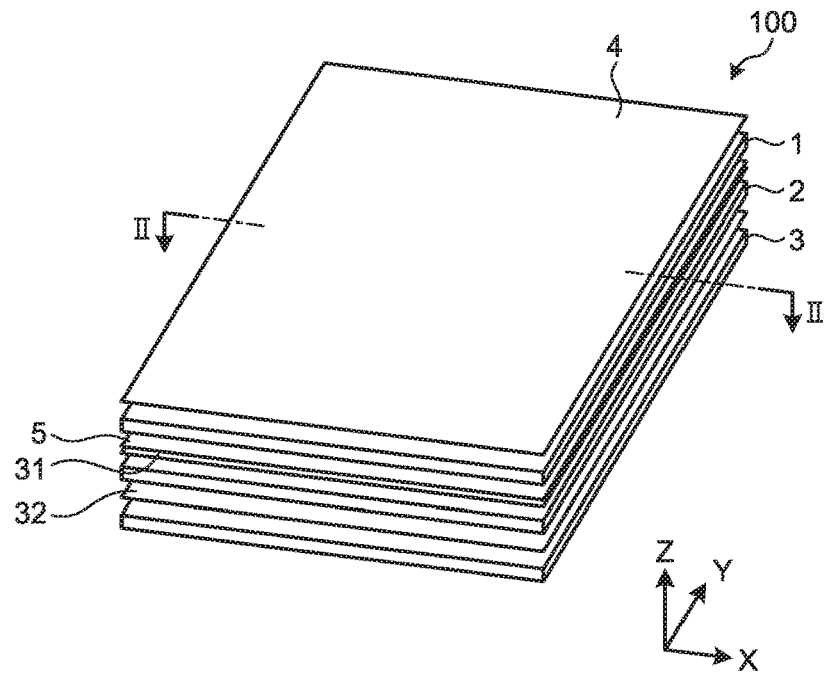
FIG. 1 is a perspective view illustrating a configuration example of a display device according to an embodiment.

Exemplary aspects (embodiments) according to the present disclosure are described below in greater detail with reference to the accompanying drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the disclosure and easily conceivable by those skilled in the art are naturally included in the scope of the disclosure. The drawings may possibly illustrate the width, the thickness, the shape, and the like of each unit more schematically than the actual aspect to simplify the explanation. These elements, however, are given by way of example only and are not intended to limit interpretation of the present disclosure. In the specification and the drawings, components similar to those previously described with reference to a preceding drawing are denoted by like reference numerals, and detailed explanation thereof will be appropriately omitted. In this disclosure, when an element A is described as being "on" another element B, the element A can be directly on the other element B, or there can be one or more elements between the element A and the other element B.

FIG. 1 is a perspective view illustrating a configuration example of a display device according to an embodiment. A display device 100 includes a first polarization member 4, a front panel 1, an optical sheet 5, a second polarization member 31, a display panel 2, a third polarization member 32, and a backlight 3. In FIG. 1, one direction extending along a planer surface of the display panel 2 is referred to as an X direction; a direction extending along the planar surface of the display panel 2 and orthogonal to the X direction is referred to as a Y direction; and a direction orthogonal to the X-Y plane is referred to as a Z direction. As viewed in the Z direction, one side relatively close to a display surface (or an upper face) through which the display panel 2 displays images is referred to as a display surface side (or an upper face side), and the other side relatively close to a back surface (or a lower face) opposite to the display surface (or the upper face) is referred to as a back surface side (or a lower face side).

As viewed from the Z direction, the third polarization member 32 and the backlight 3 overlap with the display panel 2 so as to face the back surface side of the display panel 2.

The backlight 3 is a lighting device that emits light toward the display panel 2. For example, the backlight 3 includes a light source and a light guide plate. The backlight 3 scatters light, which is emitted from the light source, through the light guide plate, and emits the scattered light from a light-emitting surface thereof facing the display panel 2.

In the Z direction, the second polarization member 31, the optical sheet 5, the front panel 1, and the first polarization member 4 are sequentially stacked on the display panel 2 on the display surface side.

Figure 2:
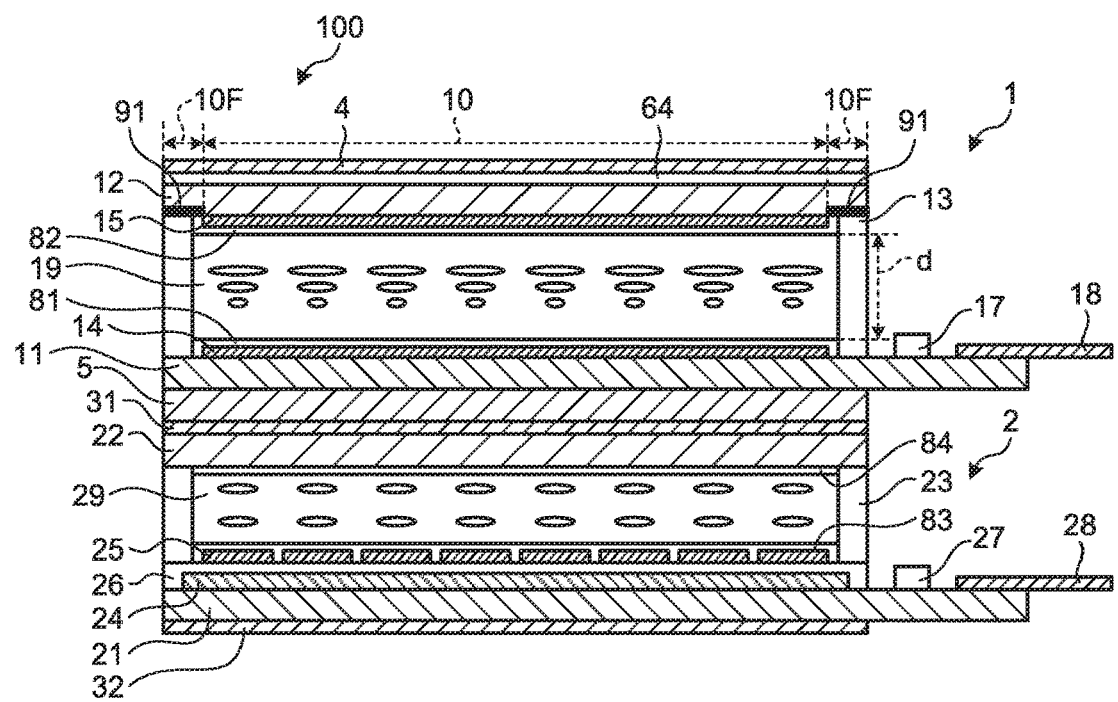
FIG. 2 is a sectional view of the display device according to the embodiment.
Figure 2:
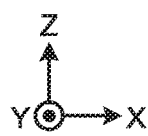
Figure 3:
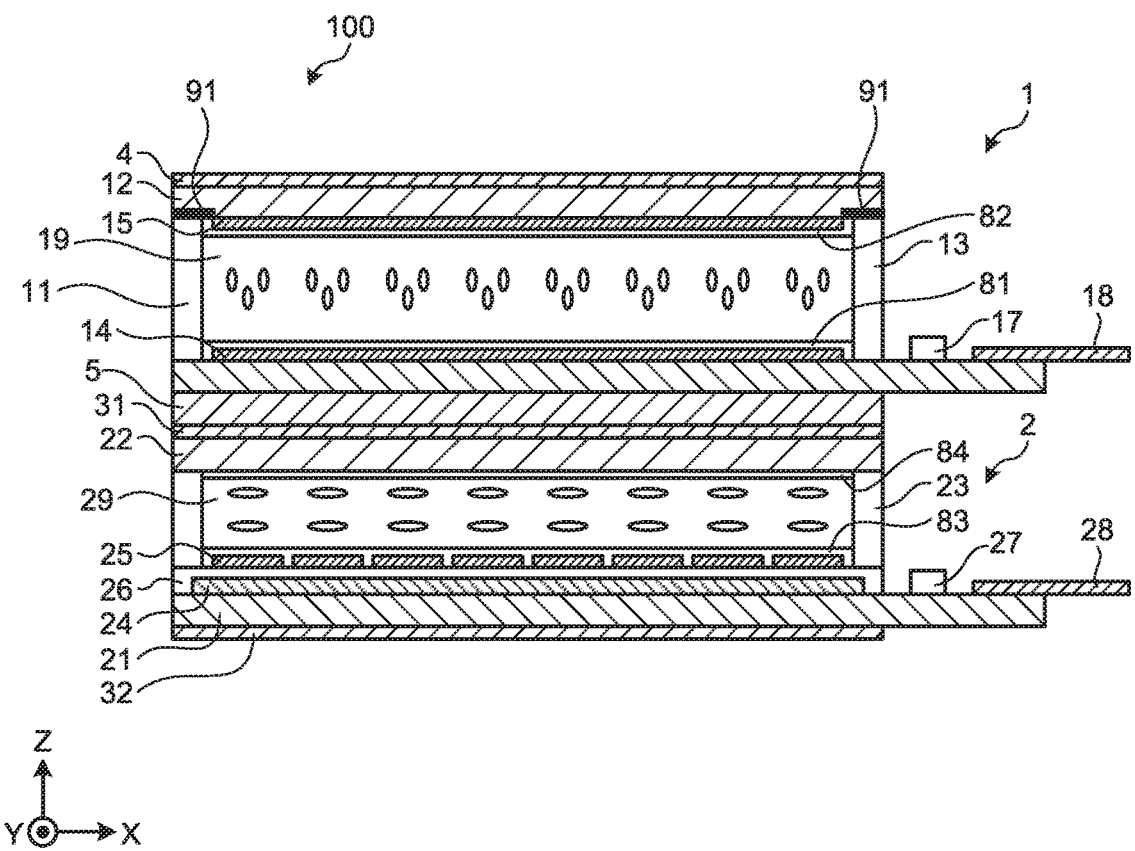
FIG. 3 is another sectional view of the display device according to the embodiment.

FIG. 2 is a sectional view of the display device according to the embodiment. Specifically, FIG. 2 is a view illustrating the display device 100 in a display state in which an image is displayed. FIG. 3 is another sectional view of the display device according to the embodiment. Specifically, FIG. 3 is a view illustrating the display device 100 in a reflective state in which incident light is reflected. The sections in FIG. 2 and FIG. 3 are schematic sections both taken along a II-II line illustrated in FIG. 1.

As illustrated in FIG. 2 and FIG. 3, the display panel 2 is what is called a liquid crystal display device. The display panel 2 includes: a translucent substrate 21; another translucent substrate 22; and a liquid crystal layer 29 interposed between the substrate 21 and the substrate 22 and sealed with a sealing layer 23.

The liquid crystal layer 29 modulates light that passes through the liquid crystal layer 29 in accordance with the state of an electric field. In the embodiment, the liquid crystal layer 29 employs a transverse electric-field mode such as a fringe field switching (FFS) mode and an in-plane switching (IPS) mode. However, the liquid crystal layer 29 is not limited to this, and may employ a vertical electric-field mode. For example, the liquid crystal layer 29 may use liquid crystal of various modes such as a twisted nematic (TN) mode, a vertical alignment (VA) mode, and an electrically controlled birefringence (ECB) mode.

Figure 4:
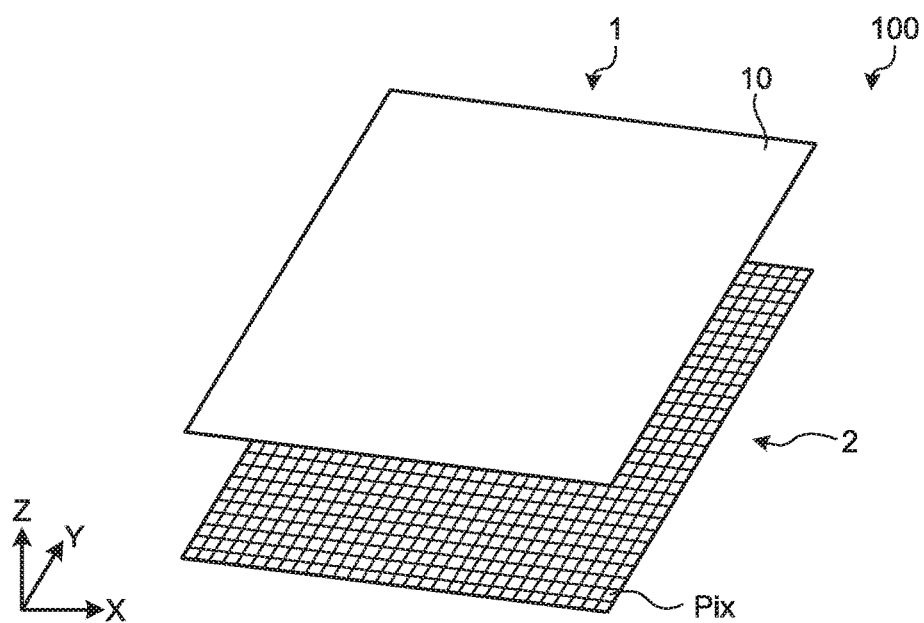
FIG. 4 is a diagram for explaining the size of pixels of a display panel and the size of a drive electrode through schematic comparison.

FIG. 4 is a diagram for explaining the size of pixels of a display panel and the size of a drive electrode through schematic comparison. The display panel 2 displays an image. The display panel 2 includes a large number of pixels Pix two-dimensionally arranged, as illustrated in FIG. 4. Light emitted from the backlight 3 (see FIG. 1) enters the display panel 2. The display panel 2 displays images by changing the transmittances of light that enters the respective pixels Pix.

The display device 100 in the embodiment can be used as a display device supporting monochromatic display and as a display device supporting chromatic display. If the display device 100 is a display device supporting chromatic display, one pixel Pix (unit pixel) serving as a unit forming a color image includes a plurality of sub-pixels. More specifically, in a display device supporting chromatic display, one pixel includes, for example, three sub-pixels, i.e., a sub-pixel for displaying red (R), a sub-pixel for displaying green (G), and a sub-pixel for displaying blue (B).

One pixel is not limited to a combination of sub-pixels for the three primary colors, R, G, and B, and can be composed of sub-pixels for the three primary colors, R, G, and B, and another color or a plurality of colors in addition to the three primary colors. More specifically, one pixel can include another sub-pixel for displaying white (W) for higher luminance, or can include at least one sub-pixel for displaying a complementary color for extending a color reproduction range, for example.

A common electrode 24 and a plurality of pixel electrodes 25 arranged in a matrix are sequentially stacked on one side of the substrate 21 illustrated in FIG. 2 and FIG. 3, the one side facing the liquid crystal layer 29. The pixel electrodes 25 and the common electrode 24 are insulated from each other by an insulating layer 26, and face each other in the Z direction that is orthogonal to the surfaces of the substrate 21. The pixel electrodes 25 and the common electrode 24 are translucent electrodes made of a translucent conductive material (translucent conductive oxide) such as indium tin oxide (ITO). The substrate 21 is a translucent substrate made of glass or the like. A laminated alignment film 83 is disposed on the one side of the substrate 21 facing the liquid crystal layer 29. The third polarization member 32 is disposed on the other side of the substrate 21 facing away from the liquid crystal layer 29.

A color filter (not illustrated) and an alignment film 84 are disposed on one side of the substrate 22 illustrated in FIG. 2 and FIG. 3, the one side facing the liquid crystal layer 29. The color filter includes color regions colored in three colors of red (R), green (G), and blue (B). The second polarization member 31 is disposed on the other side of the substrate 22 facing away from the liquid crystal layer 29.

The display panel 2 includes a drive circuit 27 called a driver integrated circuit (IC). A flexible printed circuit (FPC) board 28 supplies signals to a drive circuit 27 and drive power for driving the drive circuit 27.

As illustrated in FIG. 2 and FIG. 3, the front panel 1 includes: a first substrate 11; a second substrate 12; and a liquid crystal layer 19 interposed between the first substrate 11 and the second substrate 12 and sealed with a sealing layer 13. The first substrate 11 and the second substrate 12 are translucent substrates each made of glass or the like.

The liquid crystal layer 19 modulates incident light passing therethrough in accordance with the state of an electric field so that the polarization direction of the light can be converted. The liquid crystal layer 19 in the embodiment employs the TN mode, for example.

A drive electrode 14 having a size larger than that of the entire region covering all of the pixels Pix arranged in a matrix, which are illustrated in FIG. 4, is disposed on one side of the first substrate 11 facing the liquid crystal layer 19 illustrated in FIG. 2 and FIG. 3. A fixed-potential electrode 15 having a size larger than that of the entire region covering all of the pixels Pix arranged in a matrix, which are illustrated in FIG. 4, is disposed on one side of the second substrate 12 facing the liquid crystal layer 19. The first substrate 11 sets, through an alignment film 81, the orientation of liquid crystal that abuts on the alignment film 81 in the liquid crystal layer 19 to a constant direction. Likewise, the second substrate 12 sets, through an alignment film 82, the orientation of liquid crystal that abuts on the alignment film 82 in the liquid crystal layer 19 to a direction different from the orientation direction of the liquid crystal abutting on the first substrate 11. The drive electrode 14 and the fixed-potential electrode 15 face each other in the Z direction, which is orthogonal to the surfaces of the first substrate 11. The drive electrode 14 and the fixed-potential electrode 15 are translucent electrodes made of a translucent conductive material (translucent conductive oxide) such as ITO.

As illustrated in FIG. 2 and FIG. 3, the front panel 1 includes: a transmissive region 10 through which incident light or light from the display panel 2 is transmitted; and a frame region 10F having a lower light transmittance than that of the transmissive region 10 due to a light blocking layer 91 that blocks light on the periphery of the transmissive region 10. As illustrated in FIG. 4, the area of the transmissive region 10 is equal to the area of the display region in which all the pixels Pix are arranged.

The front panel 1 includes a drive circuit 17 called a driver IC. An FPC board 18 supplies a signal to the drive circuit 17 and drive power for driving the drive circuit 17.

A base material layer 64 made of cyclo-olefin polymer is disposed on the other side of the second substrate 12 facing away from the liquid crystal layer 19. A rubbing process is performed on the display surface side of the base material layer 64, thereby imparting a particular orientation thereto.

The first polarization member 4 is formed on the display surface side of the base material layer 64. In other words, the first polarization member 4 is disposed on the other side of the second substrate 12 facing away from the liquid crystal layer 19. The first polarization member 4 is a coating-type polarization layer obtained by mixing a liquid crystal material and a dichroic pigment together. The liquid crystal material is self-aligned along a particular orientation imparted to the base material layer 64. Consequently, the dichroic pigment is also aligned in one orientation, so that the first polarization member 4 absorbs light linearly polarized in a second polarization direction orthogonal to a first polarization direction.

The optical sheet 5 transmits light linearly polarized in the first polarization direction, and reflects light linearly polarized in the second polarization direction. The optical sheet 5 is also called a reflective polarization plate.

Figure 5:
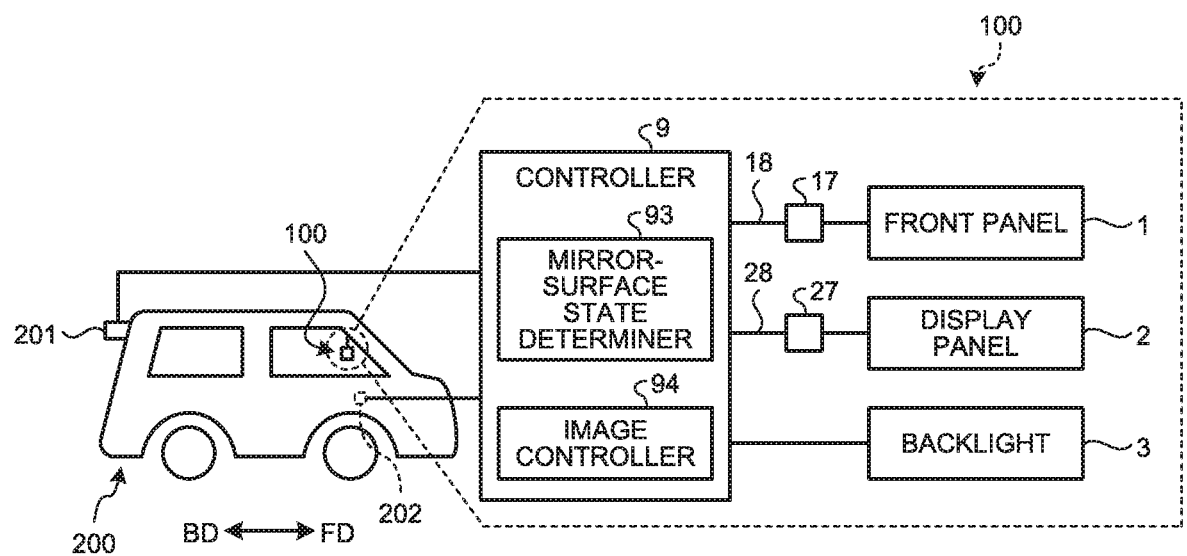
FIG. 5 is a block diagram for explaining the display device according to the embodiment.

FIG. 5 is a block diagram for explaining the display device according to the embodiment. In FIG. 5, the display device 100 according to the embodiment is used as a vehicle rearview mirror. For example, a controller 9 is a computer including a central processing unit (CPU) serving as an arithmetic device, and a memory serving as a storage device. The controller 9 can implement various functions by executing computer programs using these hardware resources.

Specifically, the controller 9 reads a computer program stored in a certain storage unit (not illustrated), develops a computer program on the memory, and causes the CPU to execute commands contained in the computer program developed on the memory. In the embodiment, the controller 9 includes a mirror-surface state determiner 93 and an image controller 94. The mirror-surface state determiner 93 and the image controller 94 are functions of the controller 9 that can be individually implemented with computer programs executed by use of the hardware resources.

The image controller 94 controls turning on and off, a light quantity, and a light intensity of the backlight 3 in accordance with execution results of commands by the CPU. The image controller 94 supplies image signals for display on the display panel 2 to the drive circuit 27 via the FPC board 28 in accordance with an execution result of a command by the CPU, so that the drive circuit 27 causes the display panel 2 to display an image. The mirror-surface state determiner 93 controls the drive circuit 17 via the FPC board 18 in accordance with an instruction signal for the display state from an input unit 202 so that the drive circuit 17 applies a voltage to the drive electrode 14. Consequently, a voltage of the drive electrode 14 becomes higher than or equal to a threshold. Alternatively, the mirror-surface state determiner 93 controls the drive circuit 17 via the FPC board 18 in accordance with an instruction signal for the reflective state from the input unit 202 so that the drive circuit 17 applies no voltage to the drive electrode 14. Consequently, a voltage of the drive electrode 14 becomes lower than the threshold.

For example, as illustrated in FIG. 5, the controller 9 is coupled to an image capturing device 201 of a vehicle 200. The image capturing device 201 captures an image of a back region BD behind the vehicle 200 and transmits the image of the back region BD behind the vehicle 200 to the controller 9. In the display state, the display device 100 displays an image of the back region BD behind the vehicle 200. In the vehicle, a position at which the image capturing device 201 is attached may be a position at which the image capturing device 201 can capture an image of a front region FD in front of the vehicle 200, or may be a position at which the image capturing device 201 can capture an image of the surroundings of the vehicle 200.

Figure 6:
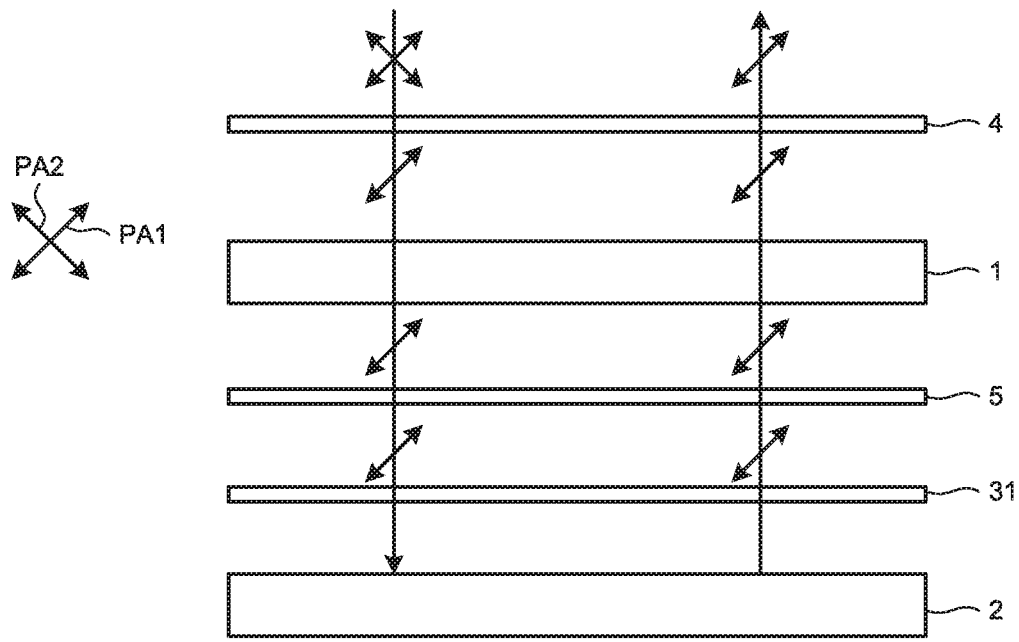
FIG. 6 is a schematic view for explaining a display state in which an image can be displayed while being in a transmissive state in which incident light is transmitted.

FIG. 6 is a schematic view for explaining the display state in which the display device can display an image while being in a transmissive state in which incident light is transmitted. As illustrated in FIG. 6, the first polarization member 4 absorbs light linearly polarized in a second polarization direction PA2 orthogonal to a first polarization direction PA1.

Light linearly polarized in the first polarization direction PA1 is transmitted through the first polarization member 4 and enters the front panel 1. FIG. 3 illustrates a state in the front panel 1, in which the drive circuit 17 applies a voltage to the drive electrode 14. Consequently, in the front panel 1, light linearly polarized in the first polarization direction PA1 and incident thereon from the first polarization member 4 is emitted toward the optical sheet 5 as it is without being converted.

In this state, when the display panel 2 displays an image, the first polarization member 4, the front panel 1, and the optical sheet 5 are not shuttered against light linearly polarized in the first polarization direction PA1, thereby making the image easily viewed.

The optical sheet 5 transmits light linearly polarized in the first polarization direction PA1 and incident thereon from the front panel 1. The second polarization member 31 transmits light linearly polarized in the first polarization direction PA1. In this manner, an image on the display panel 2 can be viewed from the display surface side of the first polarization member 4.

The display panel 2 outputs an image through the second polarization member 31 using light linearly polarized in the first polarization direction PA1.

The optical sheet 5 transmits light linearly polarized in the first polarization direction PA1 and incident thereon from the display panel 2.

In the front panel 1, light linearly polarized in the first polarization direction PA1 and incident thereon from the optical sheet 5 is emitted toward the first polarization member 4 as it is without being converted.

Light linearly polarized in the first polarization direction PA1 is transmitted through the first polarization member 4 and is emitted as an image on the display surface side of the first polarization member 4.

As described above, when the mirror-surface state determiner 93 illustrated in FIG. 5 receives the instruction signal for the transmissive state from the input unit 202, the drive circuit 17 operates so that the front panel 1 enters the transmissive state in which incident light is transmitted. The image controller 94 controls the backlight 3 and the display panel 2 to display an image on the display panel 2.

Figure 7:
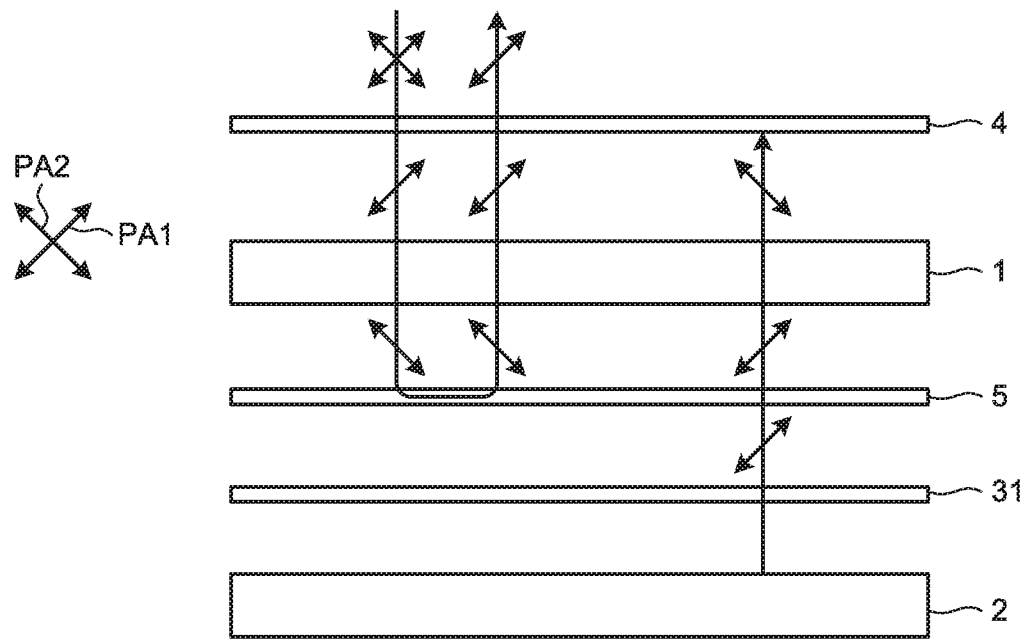
FIG. 7 is a schematic view for explaining a reflective state in which incident light is reflected.

FIG. 7 is a schematic view for explaining the reflective state in which incident light is reflected. As illustrated in FIG. 7, the first polarization member 4 absorbs light linearly polarized in the second polarization direction PA2 orthogonal to the first polarization direction PA1.

Light linearly polarized in the first polarization direction PA1 is transmitted through the first polarization member 4 and enters the front panel 1. FIG. 2 illustrates a state in the front panel 1, in which the drive circuit 17 applies no voltage to the drive electrode 14. Consequently, in the front panel 1, light linearly polarized in the first polarization direction PA1 and incident thereon from the first polarization member 4 is converted into light linearly polarized in the second polarization direction PA2, which is then emitted toward the optical sheet 5.

Light linearly polarized in the second polarization direction PA2 and incident thereon from the front panel 1 is reflected by the optical sheet 5.

After being reflected by the optical sheet 5, light linearly polarized in the second polarization direction PA2 enters the front panel 1. In the front panel 1, light linearly polarized in the second polarization direction PA2 and incident thereon from the optical sheet 5 is converted into light linearly polarized in the first polarization direction PA1, which is then emitted toward the first polarization member 4.

Light linearly polarized in the first polarization direction PA1 and incident from the front panel 1 is transmitted through the first polarization member 4, so that an image on the display surface side of the first polarization member 4 is displayed as if a mirror image as viewed from the display surface side of the first polarization member 4.

In this state, even when the display panel 2 displays an image, the first polarization member 4, the front panel 1, and the optical sheet 5 are shuttered against light linearly polarized in the second polarization direction PA2 that is obtained by converting light linearly polarized in the first polarization direction PA1 that has been emitted by the display panel 2, thereby making the image less likely to be viewed.

Specifically, the display panel 2 outputs an image through the second polarization member 31 using light linearly polarized in the first polarization direction PA1.

The optical sheet 5 transmits light linearly polarized in the first polarization direction PA1 and incident thereon from the display panel 2.

In the front panel 1, light linearly polarized in the first polarization direction PA1 and incident thereon from the optical sheet 5 is converted into light linearly polarized in the second polarization direction PA2, which is then emitted toward the first polarization member 4.

Light linearly polarized in the second polarization direction PA2 is absorbed by the first polarization member 4, so that the image is less likely to be viewed from the display surface side of the first polarization member 4.

As described above, when the mirror-surface state determiner 93 illustrated in FIG. 5 receives the instruction signal for the reflective state from the input unit 202, the drive circuit 17 operates so that the front panel 1 enters the reflective state in which incident light is reflected. In the reflective state, even when an image is displayed on the display panel 2, the image is less likely to be viewed. For this reason, when the mirror-surface state determiner 93 illustrated in FIG. 5 receives the instruction signal for the reflective state from the input unit 202, the image controller 94 causes the display panel 2 to display no image.

The first polarization member 4 contains no iodine. Iodine has a property of absorbing visible light having relatively short wavelengths. When another polarization plate formed by absorbing typical iodine on a polyvinyl alcohol (PVA) film and stretching the film in one direction to make the orientation of molecules in a constant direction is used in substitution for the first polarization member 4 to obtain the mirror state (reflective state) illustrated in FIG. 7, color shift may occur in the reflected image because iodine absorbs light having short wavelengths in the reflected image, and whiteness is shifted to greenish. On the other hand, the first polarization member 4 of the display device 100 in the embodiment is less likely to absorb light having short wavelengths for the reflected image than the polarization plate including iodine, exhibiting more neutral whiteness.

When another polarization plate formed by absorbing typical iodine on a PVA film and stretching the film in one direction to make the orientation of molecules in a constant direction is used in substitution for the first polarization member 4 to obtain the mirror state (reflective state) illustrated in FIG. 7, the stretching of the polarization plate makes the surface thereof less smooth, which may cause unevenness in the reflected image. In contrast, the display device 100 in the embodiment includes the coated polarization layer 4 that has not been stretched. As a result, the first polarization member 4 has a smooth surface, preventing unevenness in the reflected image.

As described above, the display device 100 includes the first polarization member 4, the optical sheet 5, the front panel 1, the second polarization member 31, and the display panel 2. The first polarization member 4 absorbs light linearly polarized in the second polarization direction PA2 orthogonal to the first polarization direction PAL The optical sheet 5 reflects light linearly polarized in the second polarization direction PA2 and transmits light linearly polarized in the first polarization direction PA1. The front panel 1 can change the polarization direction of incident light into another polarization direction in accordance with a voltage applied to the front panel 1. The front panel 1 is disposed between the first polarization member 4 and the optical sheet 5. When viewed from the Z direction, the display panel 2 overlaps with the front panel 1 with the second polarization member 31 interposed therebetween, the second polarization member 31 transmitting light linearly polarized in the second polarization direction PA2 to the optical sheet 5. With this configuration, the display device 100 can switch between the display state illustrated in FIG. 3 and FIG. 6 in which an image is displayed and the mirror state (reflective state) illustrated in FIG. 2 and FIG. 7 in which a reflected image is obtained.

The front panel 1 is closer to a viewer than the display panel 2 is. The front panel 1 can switch between a first front panel state and a second front panel state in accordance with the state of a voltage applied to the drive electrode 14 by the drive circuit 17. The first front panel state is a state in which light linearly polarized in the first polarization direction PA1 and incident thereon is emitted as it is without being converted. The second front panel state is a state in which light linearly polarized in the first polarization direction PA1 and incident thereon is emitted after being converted into light linearly polarized in the second polarization direction PA2.

Accordingly, the first front panel state corresponds to the reflective state, and the second front panel state corresponds to the display state. Power consumption is lower in the reflective state than that in the display state. Specifically, if an applied voltage is less than the threshold, the display device 100 reflects incident light. Consequently, the display device 100 can reduce power consumption in the reflective state.

Figure 8:
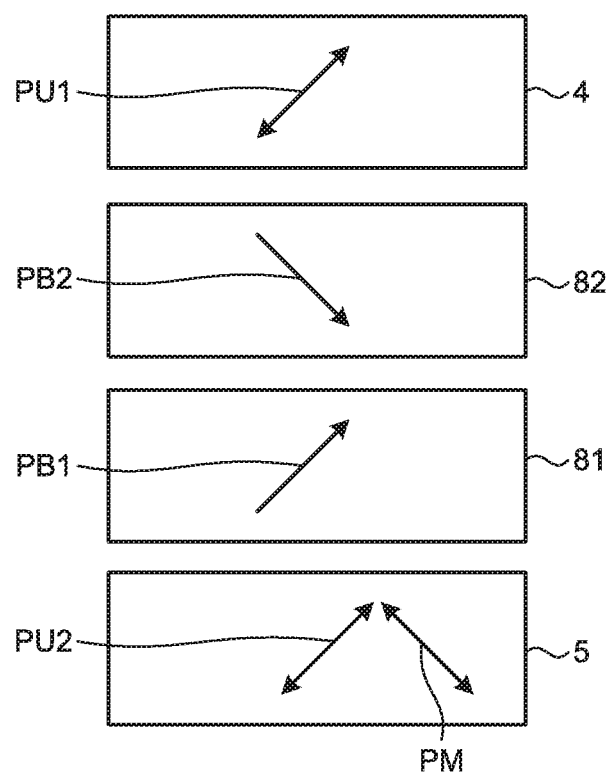
FIG. 8 is a diagram for schematically explaining a relation between a transmission axis of a first polarization member and a transmission axis of an optical sheet.

FIG. 8 is a diagram for schematically explaining a relation between the transmission axis of the first polarization member and the transmission axis of the optical sheet. FIG. 8 illustrates a transmission axis direction PU1 of the first polarization member 4, a rubbing direction PB2 of the alignment film 82, a rubbing direction PB1 of the alignment film 81, a transmission axis direction PU2 of the optical sheet 5, and a reflection axis direction PM of the optical sheet 5.

As illustrated in FIG. 8, the rubbing direction PB2 of the alignment film 82 and the rubbing direction PB1 of the alignment film 81 are directions intersecting each other in a plan view. The transmission axis direction PU1 of the first polarization member 4 and the transmission axis direction PU2 of the optical sheet 5 are parallel to each other. The transmission axis direction PU1 of the first polarization member 4 and the reflection axis direction PM of the optical sheet 5 are directions intersecting each other. With this configuration, the first polarization member 4 and the optical sheet 5 are allowed to transmit light linearly polarized in the first polarization direction PA1.

The study by the inventors of the present disclosure has found that when the transmission axis direction PU1 of the first polarization member 4 and the transmission axis PU2 of the optical sheet 5 are parallel to each other, a reflectance is reduced in comparison with a case where the transmission axis direction PU1 of the first polarization member 4 and the transmission axis PU2 of the optical sheet 5 intersect each other. As illustrated in FIG. 2, the longer a length d of a cell gap of the liquid crystal layer 19 (i.e., the thickness of the liquid crystal layer 19) is, the higher a reflectance is. Meanwhile, when the transmission axis direction of the second polarization member 31 and the transmission axis of the third polarization member 32 are parallel to each other, the display panel 2 is what is called a normally-black mode liquid crystal display device. When the display panel 2 is configured to have an increased thickness of the liquid crystal layer 29 while having the transmission axis direction of the second polarization member 31 and the transmission axis of the third polarization member 32 that are parallel to each other, responsiveness of the display panel 2 may become unsatisfactory, which may affect display quality.

Figure 9:
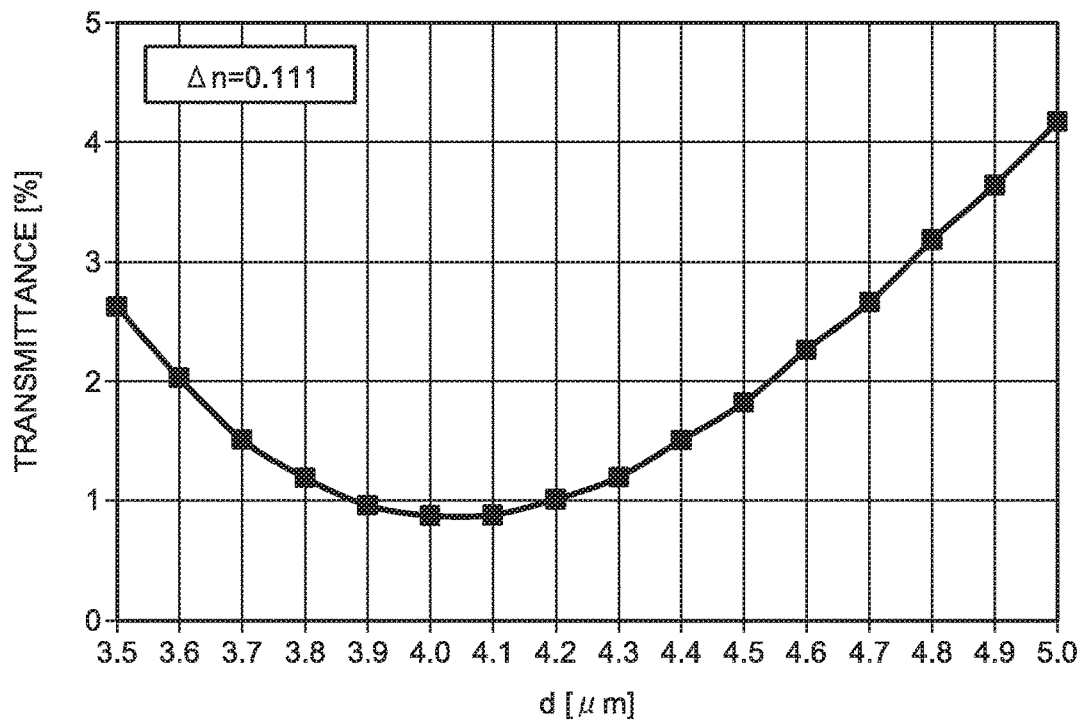
FIG. 9 is a graph for explaining a relation between a transmittance and a length of a cell gap.

FIG. 9 is a graph for explaining a relation between a transmittance and a length of the cell gap. In FIG. 9, the horizontal axis indicates a length of the cell gap, and the vertical axis indicates a transmittance in the transmissive state. In FIG. 9, a refractive index difference $\Delta n$ of liquid crystal is 0.111. A retardation $\Delta nd$ ($\mu m$) is defined as a value obtained by multiplying the refractive index difference $\Delta n$ and the length d of the cell gap.

Typically, when the display panel 2 is the display panel of the normally-black mode, responsiveness of the display panel 2 is satisfactory if the retardation $\Delta nd$ ($\mu m$) is equal to or less than 0.3885, that is, if the length d of the cell gap illustrated in FIG. 9 is equal to or less than 3.5 $\mu m$.

Nevertheless, response speed for switching between the reflective state and the display state in the front panel 1 may be lower than response speed of pixels Pix in the display panel 2 illustrated in FIG. 4.

As illustrated in FIG. 9, as the length d of the cell gap (the retardation $\Delta nd$) increases, the transmittance of the front panel 1 in the reflective state decreases one time while the reflectance increases. When the length d of the cell gap exceeds a certain value, the transmittance of the front panel 1 in the reflective state turns into increase, while the reflectance turns into decrease.

If the refractive index difference $\Delta n$ is 0.111 and the length d of the cell gap is in a range of $3.6 \leq d \leq 4.5$, the retardation $\Delta nd$ satisfies Expression (1) below, so that the transmittance of the front panel 1 in the reflective state is equal to or less than 2%.

$$0.3996 \leq \Delta nd \leq 0.4995 \qquad (1)$$

To further reduce the transmittance of the front panel 1 in the reflective state to increase the reflectance, the transmittance of the front panel 1 in the reflective state is preferably equal to or less than 1%.

If the refractive index difference $\Delta n$ is 0.111 and the length d of the cell gap is in a range of $3.9 \leq d \leq 4.2$, the retardation $\Delta nd$ satisfies Expression (2) below, so that the transmittance of the front panel 1 in the reflective state is equal to or less than 1%.

$$0.4329 \leq \Delta nd \leq 0.4662 \qquad (2)$$

More preferably, if the refractive index difference $\Delta n$ is 0.111 and the length d of the cell gap is in a range of $4.0 \leq d \leq 4.1$, the retardation $\Delta nd$ satisfies Expression (3) below, so that the transmittance of the front panel 1 in the reflective state is less than 1%.

$$0.444 \leq \Delta nd \leq 0.4551 \qquad (3)$$

As described above, as the retardation $\Delta nd$ increases, the length d of the cell gap also increases, thereby lowering the possibility of a short-circuit between the drive electrode 14 and the fixed-potential electrode 15.

Figure 10:
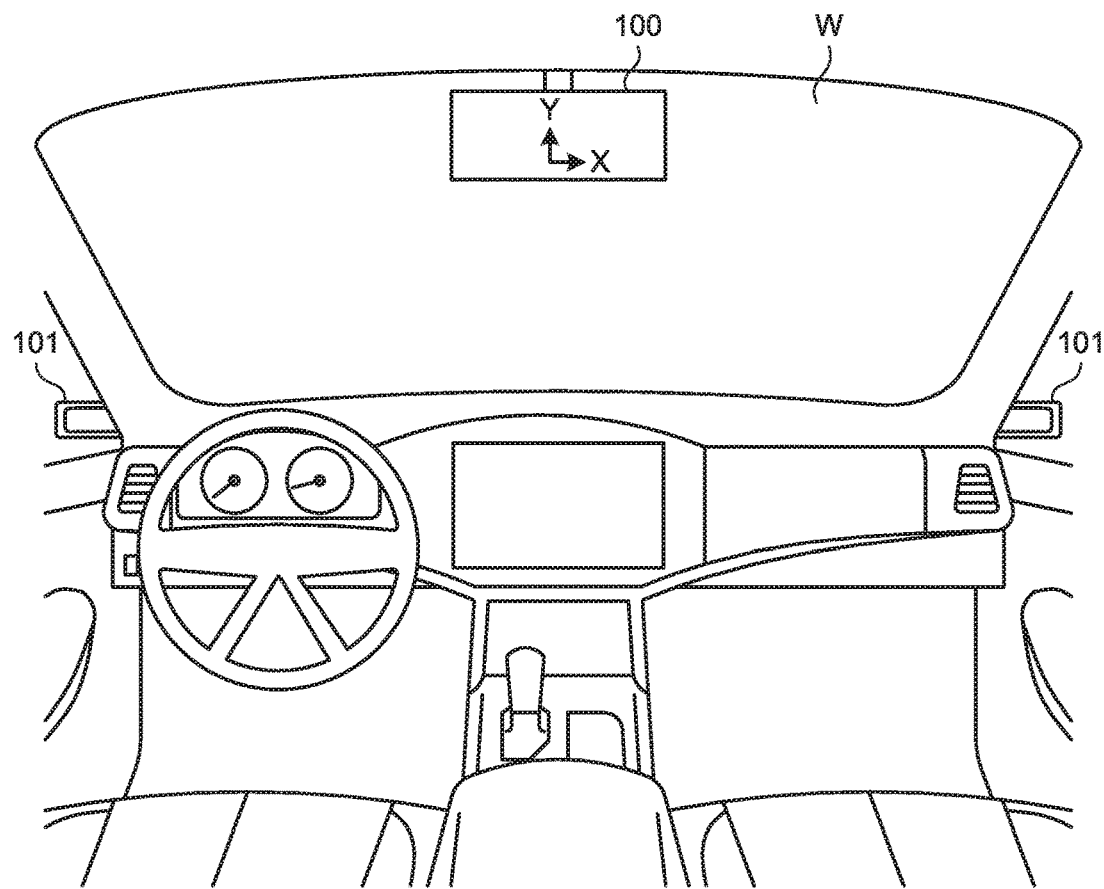
FIG. 10 is a diagram illustrating an attached state of a vehicle rearview mirror.

FIG. 10 is a diagram illustrating an attached state of a vehicle rearview mirror. In FIG. 10, the display device 100 according to the embodiment is used as a rearview mirror disposed in the upper central part of a window W. The vehicle rearview mirror can display an image both in the reflective state in which incident light is reflected and in the transmissive state in which incident light is transmitted.

When a voltage applied to the drive electrode 14 is less than the threshold, the display device 100 is in the reflective state in which incident light is reflected , and serves as a mirror that specularly reflects incident light from behind the vehicle, allowing a driver to view the region behind the vehicle. In the reflective state, the controller 9 illustrated in FIG. 5 does not cause the display panel 2 to display any image of the back region BD behind the vehicle 200.

In the display state, the display panel 2 of the display device 100 displays an image captured by the image capturing device 201 (see FIG. 5) for the back region. Alternatively, in the display state, the display panel 2 of the display device 100 may display an image captured by an image capturing device for the surroundings of the vehicle.

The display device 100 according to the embodiment may be applied to vehicle sideview mirrors 101. The vehicle sideview mirrors 101 are disposed on the exterior of the vehicle but may be disposed in the interior of the vehicle.

Figure 11:
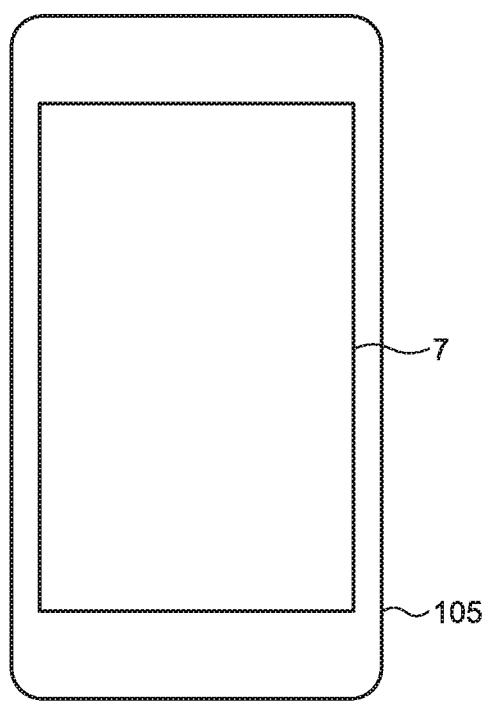
FIG. 11 is a diagram illustrating another example of employing the display device according to the embodiment.

FIG. 11 is a diagram illustrating another example of employing the display device according to the embodiment. The constituent elements already described in the embodiment are assigned the same reference signs, and the descriptions thereof are omitted. In FIG. 11, the display device 100 is applied to a display unit 7 of a portable apparatus 105. In the reflective state, the display unit 7 performs specular reflection. In the display state, the display unit 7 displays an image.

While preferred embodiments according to the present disclosure have been described, the embodiment is not intended to limit the present disclosure. The contents disclosed in the embodiment are given by way of example only, and various changes may be made without departing from the spirit of the present disclosure. Appropriate changes made without departing from the spirit of the present disclosure naturally fall within the technical scope of the present disclosure. For example, a translucent optical resin or a film of various types, which does not inhibit any actions brought by the aspects described in the embodiment, may be interposed between any adjacent ones of the first polarization member 4, the optical sheet 5, the front panel 1, the second polarization member 31, and the display panel 2 according to the embodiment. The first polarization member 4 may be a polarization plate formed by absorbing iodine on a PVA film and stretching the film in one direction to make the orientation of molecules in a constant direction.

The present disclosure can naturally provide other advantageous effects that are provided by the aspects described in the embodiment above and are clearly defined by the description in the present specification or appropriately conceivable by those skilled in the art.

What is claimed is:

1. A display device comprising:
    a first polarization member configured to absorb light linearly polarized in a second polarization direction orthogonal to a first polarization direction;
    an optical sheet configured to reflect light linearly polarized in the second polarization direction and transmit light linearly polarized in the first polarization direction;
    a front panel disposed between the first polarization member and the optical sheet and capable of changing a polarization direction of incident light into another polarization direction in accordance with a voltage applied to the front panel; and
    a display panel overlapping with the front panel with a second polarization member interposed therebetween, the second polarization member configured to transmit light linearly polarized in the second polarization direction to the optical sheet; wherein
    the front panel includes a liquid crystal layer, and
    a retardation $\Delta nd$ (μm) of the liquid crystal layer satisfies the following Expression (1):

$$0.3996 \leq \Delta nd \leq 0.4995 \tag{1}$$

2. The display device according to claim 1, wherein
    the front panel includes a liquid crystal layer, and
    a retardation $\Delta nd$ (μm) of the liquid crystal layer satisfies the following Expression (2):

$$0.4329 \leq \Delta nd \leq 0.4662 \tag{2}$$

3. The display device according to claim 1, wherein
    a transmission axis of the first polarization member and a transmission axis of the optical sheet are parallel to each other, and
    a retardation $\Delta nd$ (μm) satisfies the following Expression (3):

$$0.444 \leq \Delta nd \leq 0.4551 \tag{3}$$

4. A vehicle rearview mirror capable of displaying an image both in a reflective state in which incident light is reflected and in a transmissive state in which incident light is transmitted, the vehicle rearview mirror comprising:
    the display device according to claim 1; and
    an image capturing device configured to capture an image of a region behind a vehicle, wherein
    the display panel displays an image in the transmissive state, and
    the display panel displays no image in the reflective state.

5. The vehicle rearview mirror according to claim 4, wherein
    the front panel includes a liquid crystal layer, and
    a retardation $\Delta nd$ (μm) of the liquid crystal layer satisfies the following Expression (2):

$$0.4329 \leq \Delta nd \leq 0.4662 \tag{2}$$

6. The vehicle rearview mirror according to claim 4, wherein
    a transmission axis of the first polarization member and a transmission axis of the optical sheet are parallel to each other, and
    a retardation $\Delta nd$ (μm) satisfies the following Expression (3):

$$0.444 \leq \Delta nd \leq 0.4551 \tag{3}$$

* * * * *